Patented Sept. 7, 1943

2,328,929

UNITED STATES PATENT OFFICE 2,328,929

PROCESS FOR THE MANUFACTURE OF 2-MERCAPTO-THIAZOLINE

Seaphes D. Shinkle, Passaic, N. J., assignor to United States Rubber Company, New York, N. Y., a corporation of New Jersey No Drawing. Application October 2, 1940, Serial No. 359,347

3 Claims. (Cl. 260—302)

An object of this invention is to provide a new process for the manufacture of 2-mercapto-thiazolines. Another object is to provide such a process which is economical to practice and yielding a highly commercial product.

According to the invention, a beta-amino alkyl sulphuric acid is reacted with an alkali alkyl xanthogenate, in the presence of alkali using a liquid single phase medium, for example, water, alcohol, or alcohol-water. The use of a single phase medium is to be distinguished from a two-phase system such as carbon disulphide and water, in which the low boiling liquid carbon disulphide layer would tend to limit the temperature of reaction and thus bring about a long-time reaction. In contrast, the present procedure permits higher temperature and hence more rapid reaction. The amount of alkali used such as sodium hydroxide is molecularly equivalent to the amount of the alkali alkyl xanthogenate used. In practice a small amount of acid is used to acidify the solution after the reaction is completed, and where an excess of alkali is originally used, a chemically equivalent amount of acid should be added to free the 2-mercapto-triazoline. The reaction may be illustrated as follows:

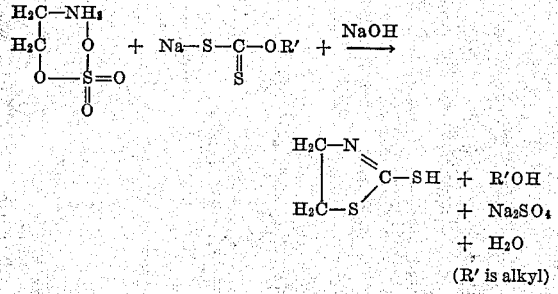

(R' is alkyl)

The following example illustrates the preparation of 2-mercapto thiazoline:

13.0 grams (0.1 mol) of sodium methyl xanthogenate are dissolved in a mixture of 15 grams of methyl alcohol and 4 grams of water. To this solution is added 14.1 grams (0.1 mol) of beta-amino ethyl sulfuric acid dissolved in 25 grams of water containing 4 grams of sodium hydroxide. The reaction mixture is heated on a steam-bath for three hours. On cooling, 2-mercapto-thiazoline (melting point 106–107° C.) crystallizes from the solution. The yield may be slightly improved by acidifying the filtrate with sulfuric acid (about 10 cc. of 6-normal), evaporating to 15 cc. volume and cooling.

Instead of sodium methyl xanthogenate, other alkali methyl xanthogenates, or other sodium alkyl xanthogenates, or other alkali methyl alkyl xanthogenates, may be used.

The preferred temperatures of reaction are from 70°–100° C. although the invention is not limited to these temperatures.

Although agitation is not mentioned in the above example, it may be employed during the course of the reaction. The time of mixing of reactants may be slow or rapid.

Also the method of the invention is not limited to method of heating, type of reaction vessel, order of addition of reactants, or the amount of water used in the reaction.

Having thus described my invention, what I claim and desire to protect by Letters Patent is:

1. A method which comprises reacting at an elevated temperature a 2-amino alkyl sulphuric acid with a preformed alkali alkyl xanthogenate in the presence of alkali molecularly equivalent to the amount of the xanthogenate in a homogeneous liquid medium in which the reactants are soluble, and cooling the reaction mix to recover crystals of a 2-mercapto-thiazoline.

2. A method which comprises reacting at an elevated temperature a 2-amino alkyl sulphuric acid with a preformed alkali alkyl xanthogenate in the presence of alkali molecularly equivalent to the amount of the xanthogenate in a homogeneous liquid medium in which the reactants are soluble, and thereafter cooling and acidifying the solution and recovering crystals of a 2-mercapto-thiazoline.

3. A method which comprises reacting at an elevated temperature 2-amino ethyl sulphuric acid with an alkali methyl xanthogenate in the presence of alkali molecularly equivalent to the amount of the xanthogenate in a homogeneous liquid medium in which the reactants are soluble, and thereafter cooling and acidifying the solution and recovering crystals of 2-mercapto-thiazoline.

SEAPHES D. SHINKLE.